(12) United States Patent
Hart et al.

(10) Patent No.: US 8,042,237 B2
(45) Date of Patent: Oct. 25, 2011

(54) CABLE ROUTING CLIP

(75) Inventors: Vincent Paul Hart, Bristol (GB); Derek Paul Baron, Bristol (GB)

(73) Assignee: Airbus Operations Limited, Bristol (GB)

( * ) Notice: Subject to any disclaimer, the term of this patent is extended or adjusted under 35 U.S.C. 154(b) by 896 days.

(21) Appl. No.: 11/953,017

(22) Filed: Dec. 8, 2007

(65) Prior Publication Data

US 2008/0134477 A1 Jun. 12, 2008

(30) Foreign Application Priority Data

Dec. 12, 2006 (GB) .................................. 0624778.7

(51) Int. Cl.
*F16L 3/08* (2006.01)
(52) U.S. Cl. ............................ 24/457; 24/459; 248/68.1
(58) Field of Classification Search ................ 24/115 R, 24/457, 459, 543; 174/72 R, 72 A, 72 C, 174/97, 68.1, 68.3; 248/68.1, 74.1–74.4
See application file for complete search history.

(56) References Cited

U.S. PATENT DOCUMENTS

| | | |
|---|---|---|
| 1,895,656 A | 2/1932 | Gadke |
| 3,584,795 A | 6/1971 | Baird |
| 5,463,189 A | 10/1995 | Deneke et al. |
| 5,542,636 A | 8/1996 | Mann et al. |
| 6,892,020 B2 | 5/2005 | Douglas et al. |
| 2008/0078891 A1 * | 4/2008 | Hobson .......................... 248/74.2 |

FOREIGN PATENT DOCUMENTS

| | | |
|---|---|---|
| EP | 1376808 A1 | 1/2004 |
| GB | 971426 A | 9/1964 |
| GB | 1258501 A | 12/1971 |
| GB | 2122248 A | 1/1984 |

OTHER PUBLICATIONS

GB Search Report for GB0624778.7 dated Apr. 17, 2007.
GB Search Report for GB0624778.7 dated Oct. 1, 2007.

* cited by examiner

*Primary Examiner* — James Brittain
(74) *Attorney, Agent, or Firm* — Lowe, Hauptman, Ham & Berner, LLP

(57) ABSTRACT

A cable routing system comprising: a raceway having one or more cable supports; and a routing clip comprising a body portion; one or more cable supports; a clip arm extending from the body portion and configured to bend resiliently in a bending plane; and a pair of projections with opposed faces which are directed at an angle to the bending plane of the clip arm. The routing clip is secured to the cable raceway by its resilient clip arm with the projections positioned on opposite sides of part of the raceway so as to restrain movement of the clip.

A method of installing cables in a cable routing system, the cable routing system including a raceway carrying one or more cables in a cable-receiving trough. The method comprises: securing a routing clip to the raceway with a resilient clip arm; and installing a cable in a cable support of the routing clip.

10 Claims, 7 Drawing Sheets

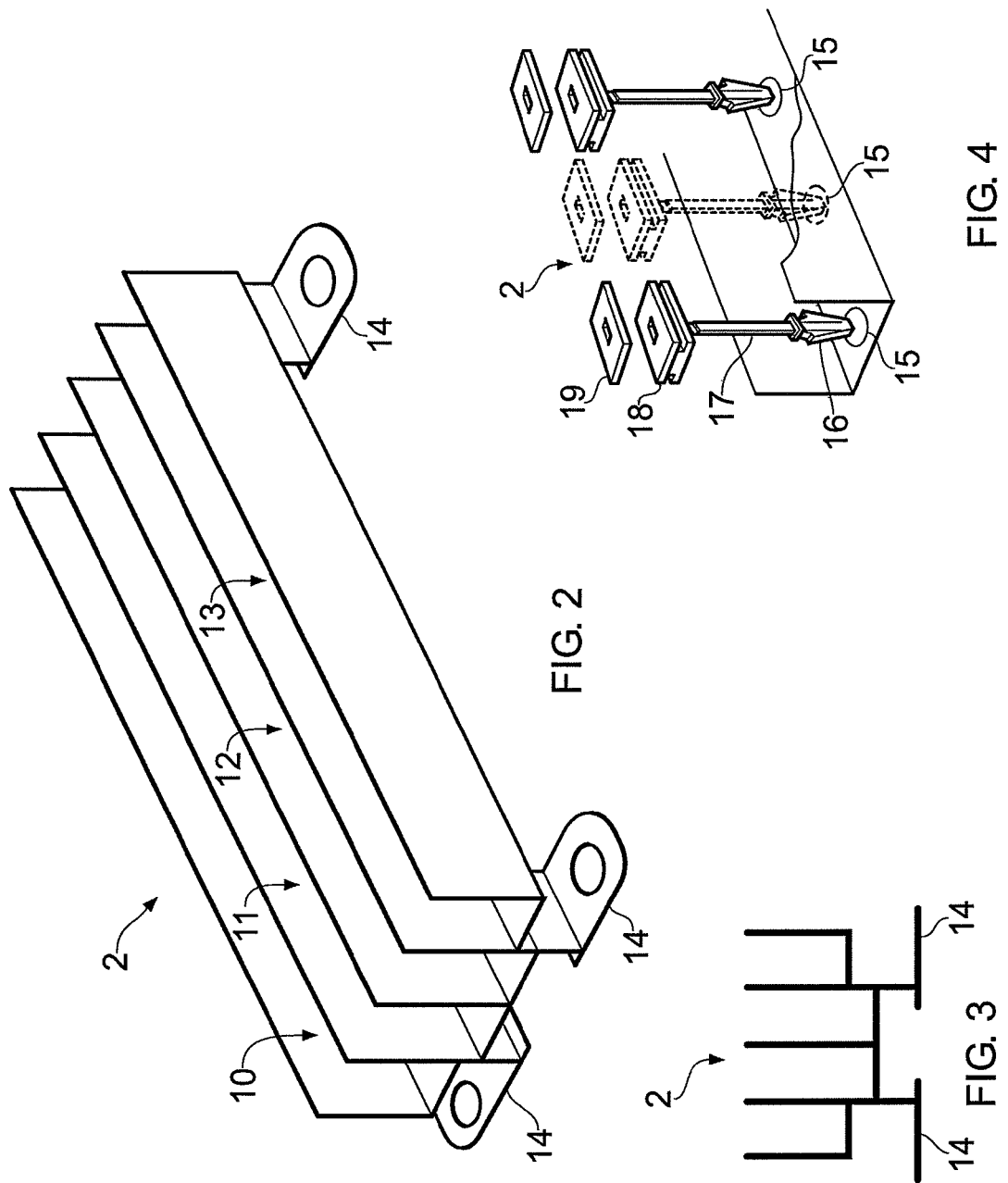

CABLE ROUTING CLIP

RELATED APPLICATIONS

The present application is based on, and claims priority from, British Application Number 0624778.7, filed Dec. 12, 2006, the disclosure of which is hereby incorporated by reference herein in its entirety.

FIELD OF THE INVENTION

The present invention relates to a cable routing clip, and to a cable routing system which employs such a clip. Typically, although not exclusively, the cable routing system is installed on an aircraft.

BACKGROUND OF THE INVENTION

It is desirable to provide a method of fitting cables to a raceway, such that the cables are less likely to damage the raceway and/or cause short circuits.

A conventional cable routing clip is described in U.S. Pat. No. 6,892,020. This employs mounting tabs which fit into slots in a support structure. A problem with such a clip is that the support structure must be specially adapted to receive the clip, by providing slots in the structure. Therefore the clip is not suitable for fitting to a conventional raceway.

SUMMARY OF THE INVENTION

A first aspect of the invention provides a cable routing system comprising: a raceway having one or more cable supports; and a routing clip comprising a body portion; one or more cable supports; a clip arm extending from the body portion and configured to bend resiliently in a bending plane; and a pair of projections with opposed faces which are directed at an angle to the bending plane of the clip arm. The routing clip is secured to the cable raceway by its resilient clip arm with the projections positioned on opposite sides of part of the raceway so as to restrain movement of the clip.

A second aspect of the invention provides a cable routing clip comprising a body portion; one or more cable supports; a clip arm extending from the body portion and configured to bend resiliently in a bending plane; and a pair of projections which extend from the clip arm and have opposed faces which are directed at an angle to the bending plane of the clip arm.

The second aspect of the invention provides a clip which is suitable for use in the system of the first aspect. In use the cable routing clip can be secured to a cable raceway by its resilient clip arm. The raceway typically has one or more cable supports such as P-clips or cable troughs. The projections can then be fitted on opposite sides of part of the raceway (such as a fairlead assembly) to restrain movement of the clip along the length of the raceway.

The clip may have a single clip arm only, or a pair of clip arms, each clip arm extending from the body portion and configured to bend resiliently in the bending plane.

Especially where only a single clip arm is provided, then typically the clip has a gripping arm extending from the body portion, wherein the gripping arm and the clip arm have opposed faces which are directed substantially parallel to the bending plane of the clip arm. A pair of such gripping arms may be provided, the pair of gripping arms having opposed faces which are directed at an angle to the bending plane of the clip arm.

The opposed faces of the pair of projections may be directed at a non-perpendicular angle, or more preferably directed at an angle of substantially 90° to the bending plane of the clip arm.

The pair of projections may extend from the clip arm either at an intermediate position along the length of the clip arm, or at its distal end.

The (or each) cable support may be for example a trough in which a cable is secured by a cable tie.

A third aspect of the invention provides a method of installing cables in a cable routing system, the cable routing system including a raceway carrying one or more cables in a cable-receiving trough, the method comprising: securing a routing clip to the raceway with a resilient clip arm; and installing a cable in a cable support of the routing clip.

The third aspect of the invention provides a method of method of retrofitting a cable to a raceway, such that the cable is less likely to damage the raceway and/or cause short circuits with other cables which are carried by the raceway. Preferably the routing clip is secured to the raceway after the cable(s) have been installed in the cable-receiving trough of the raceway.

The cable support of the routing clip may comprise a cable trough or any other geometry suitable for supporting a cable.

BRIEF DESCRIPTION OF THE DRAWINGS

Embodiments of the invention will now be described with reference to the accompanying drawings, in which:

FIG. 2 is an isometric view of part of a raceway;

FIG. 3 is a cross section through the raceway;

FIG. 4 is a view of part of the raceway showing three fairlead assemblies;

DETAILED DESCRIPTION OF EMBODIMENT(S)

Figure 1:
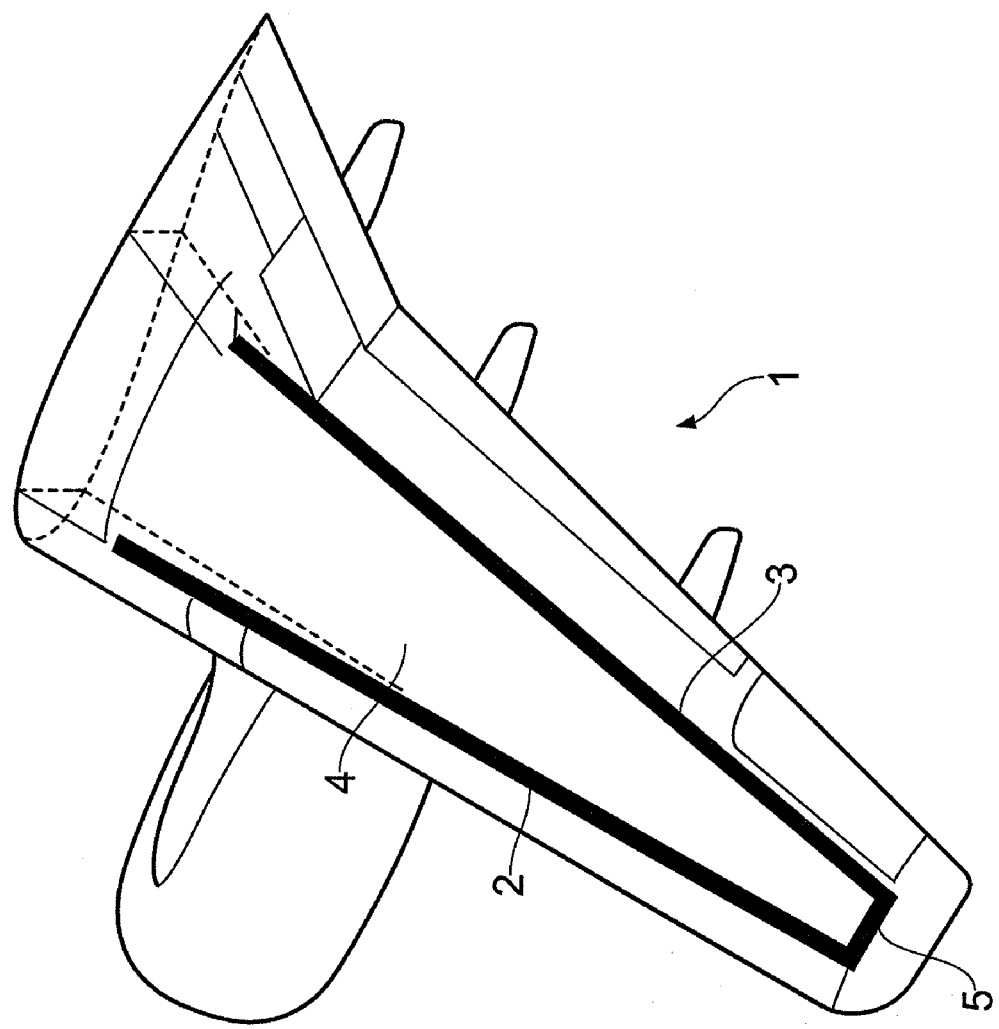
FIG. 1 is a schematic view of an aircraft wing.

An aircraft wing 1 shown in FIG. 1 comprises a pair of raceways 2,3 mounted on spars at the leading and trailing edges of the wingbox 4, and a raceway 5 at the tip of the wingbox 4.

A portion of one of the raceways 2 is shown in FIGS. 2-4. The raceway comprises a set of four cable-receiving troughs 10-13, each having a base and a pair of parallel side walls. The troughs 10-13 are left open for repair and inspection purposes. The raceway 2 is attached to a leading-edge spar (not shown) via attachment legs 14. Each trough 10-13 has a line of holes 15 in its base, three such holes 15 being shown in FIG. 4. Cables (not shown) are laid along the length of each trough 10-13, on each side of the holes 15. After the cables have been laid, they are clamped in place by fairlead assemblies shown in FIG. 4. Each fairlead assembly comprises a harpoon tie, a fairlead 18 and a clamp 19. The head 16 of the harpoon tie is passed through each hole 15. As it passes through the hole, the head contracts and then springs back when it clears the hole, preventing the head from being pulled back through the hole. The fairlead 18 is then threaded onto the shaft 17 of the harpoon tie until it engages the cables. The clamp 19 is then threaded onto the shaft 17 until it engages the fairlead 18, and then pushed further to urge the fairlead against the cables and apply a clamping force. The clamp 19 is held in place by a conventional cable-tie ratchet mechanism: that is, the shaft 17 of the harpoon tie carries a series of saw-tooth serrations (not shown) which engage with a spring arm (not shown) in the hole of the clamp 19 which allows the clamp 19 to be threaded onto the shaft 17, but prevents it moving back.

Figure 5:
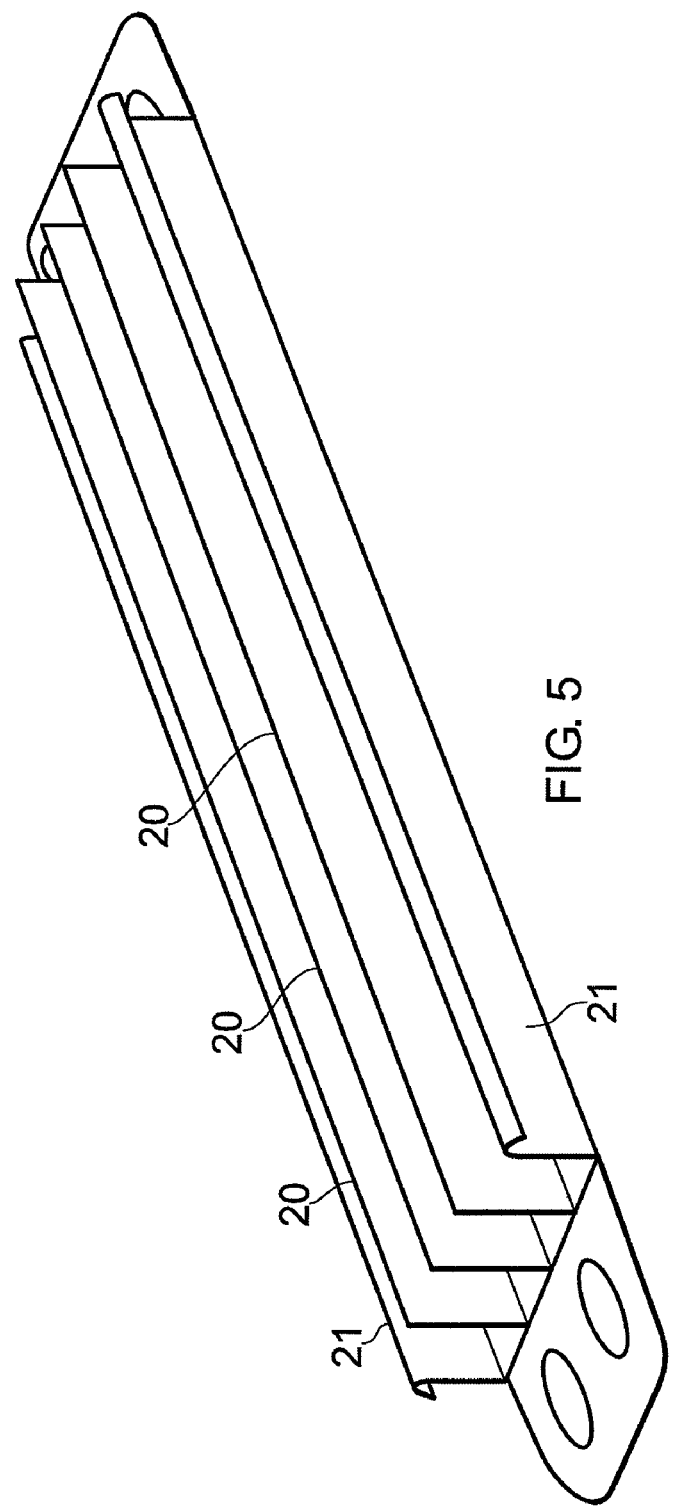
FIG. 5 is an isometric view of part of a raceway with an alternative profile.
Figure 6:
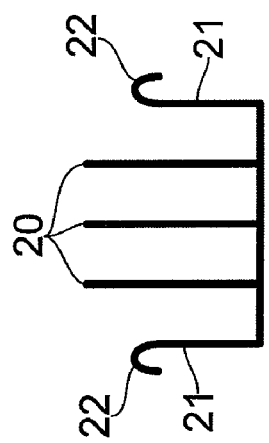
FIG. 6 is a cross section through the raceway of FIG. 5.

An alternative raceway profile is shown in FIGS. 5 and 6. The raceways 2,3,5 may all have this profile, or the profile of each raceway may change along its length between the profile shown in FIGS. 2-4 and the profile shown in FIGS. 5,6. In the profile shown in FIGS. 5 and 6 the inner three side walls 20 are higher than the outer side walls 21, and the outer side walls 21 have curved hook portions 22.

The cables carried by the raceways may include, for instance:
   "critical" cables such as:
      fuel gauge data cables
      fuel pump power cables
      fly-by-wire data cables
   "non-critical" cables such as:
      wingtip strobe light power cables (three-phase 115VAC)
      wingtip navigation light power cables (single phase 115VAC)

The critical cables are generally housed in the inner troughs 11,12 and the non-critical cables in the outer troughs 10,13.

In the event of abrasion of the cable insulation, short circuits may occur between the cables and between the cable and earth. Under these circumstances (and in particular for CF type cable) the cable can be subject to carbon arc tracking especially where relatively high power circuits are involved—such as with the wingtip strobe light power cables and wingtip navigation light power cables. Carbon arc tracking can damage adjacent cables, and even burn through the raceway when damaged. Thus it is desirable to provide a method of retrofitting such cables to a raceway which is already in place in the wing, such that the cables are less likely to damage the raceway and/or cause short circuits. The method needs to be robust enough to withstand the normal rigours that are experienced in the wing, including maintenance, and to be able to be installed easily and quickly. The method must also provide the necessary segregation from cables in the raceway (to prevent short circuits) and standoff from the raceway (to prevent damage to the raceway in the event of a carbon arc).

A cable routing clip 30 for such a purpose is shown in FIGS. 7-10. The clip has a body portion 31 carrying a cable-receiving trough 32; and a clip arm 33 extending from the body portion 31 which it meets at a corner 34. The clip arm 33 carries a second cable-receiving trough 55 at its proximal end. The clip arm 33 is configured to bend resiliently in a bending plane perpendicular to the length of the raceway. The bending plane is shown by a dashed line 38 in FIGS. 7 and 9, and the bending motion is shown by an arrow 35 in FIG. 8.

The troughs 32,55 each have a respective slot 32',55' which passes through the full width of the trough and receives a cable tie (not shown) to secure cables in the saddle.

Figure 8:
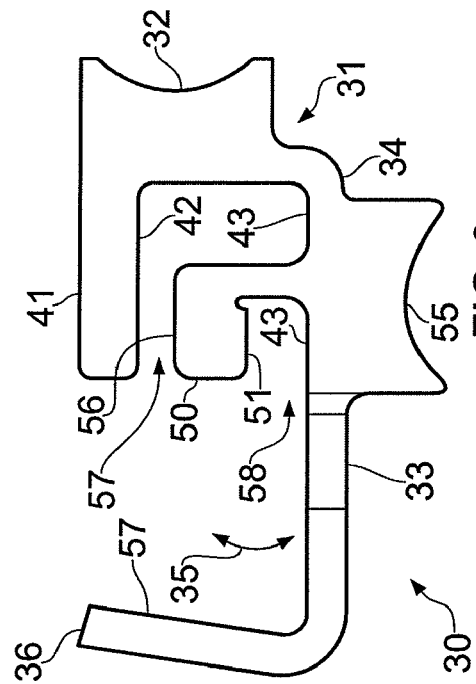
FIG. 8 is a side view of the first cable routing clip.
Figure 10:
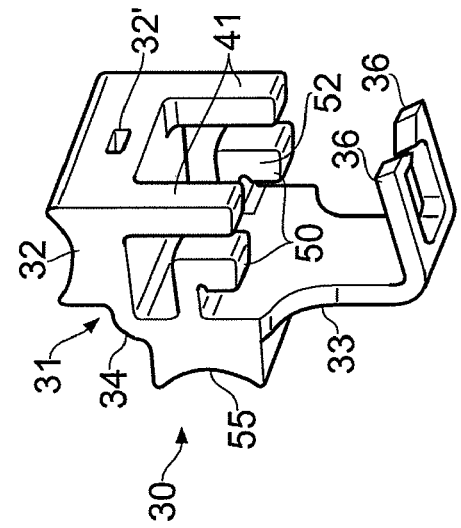
FIG. 10 is an isometric view of the first cable routing clip.

A pair of projections 36 extend from the distal end of the clip arm 33 at an acute angle as shown in FIG. 8. As shown most clearly in FIG. 9, the projections have opposed faces 37 which are directed at 90° to the bending plane 38 (that is, a line normal to the faces 37 extends at 90° to the bending plane 38) and define a slot between them. The projections 36 also have hooks at their distal end with inwardly directed faces 39 and ramps 40.

A pair of gripping arms 41 extend from the body portion 31 opposite to the clip arm 33, and a pair of hooks 50 extend from the proximal end of the clip arm 33. The gripping arms 41 and the hooks 50 have opposed faces 42,56 respectively which are directed parallel to the bending plane 38 and define an outer slot 57 shown in FIG. 8. The clip arm 33 and the hooks 50 also have opposed faces 43,51 respectively which are directed parallel to the bending plane 38 and define an inner slot 58 shown in FIG. 8.

Figure 7:
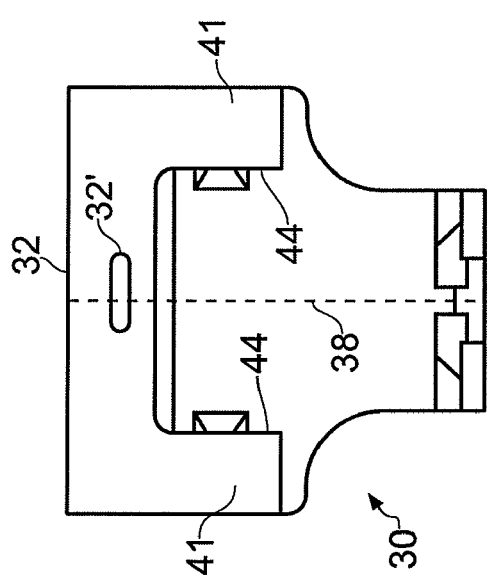
FIG. 7 is a front view of a first cable routing clip.
Figure 9:
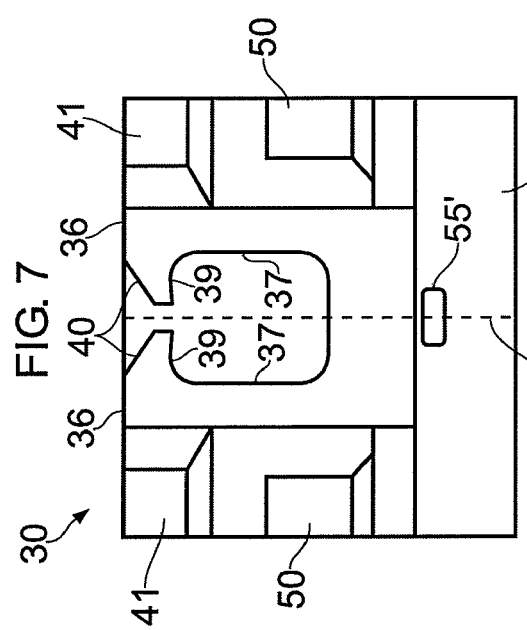
FIG. 9 is an underside view of the first cable routing clip.

The pair of gripping arms 41 have opposed faces 44 shown in FIG. 7 which are directed at 90° to the bending plane 38. The hooks 50 also have opposed faces 52 (one of the faces being shown in FIG. 10) which are directed at 90° to the bending plane 38.

Figure 11:
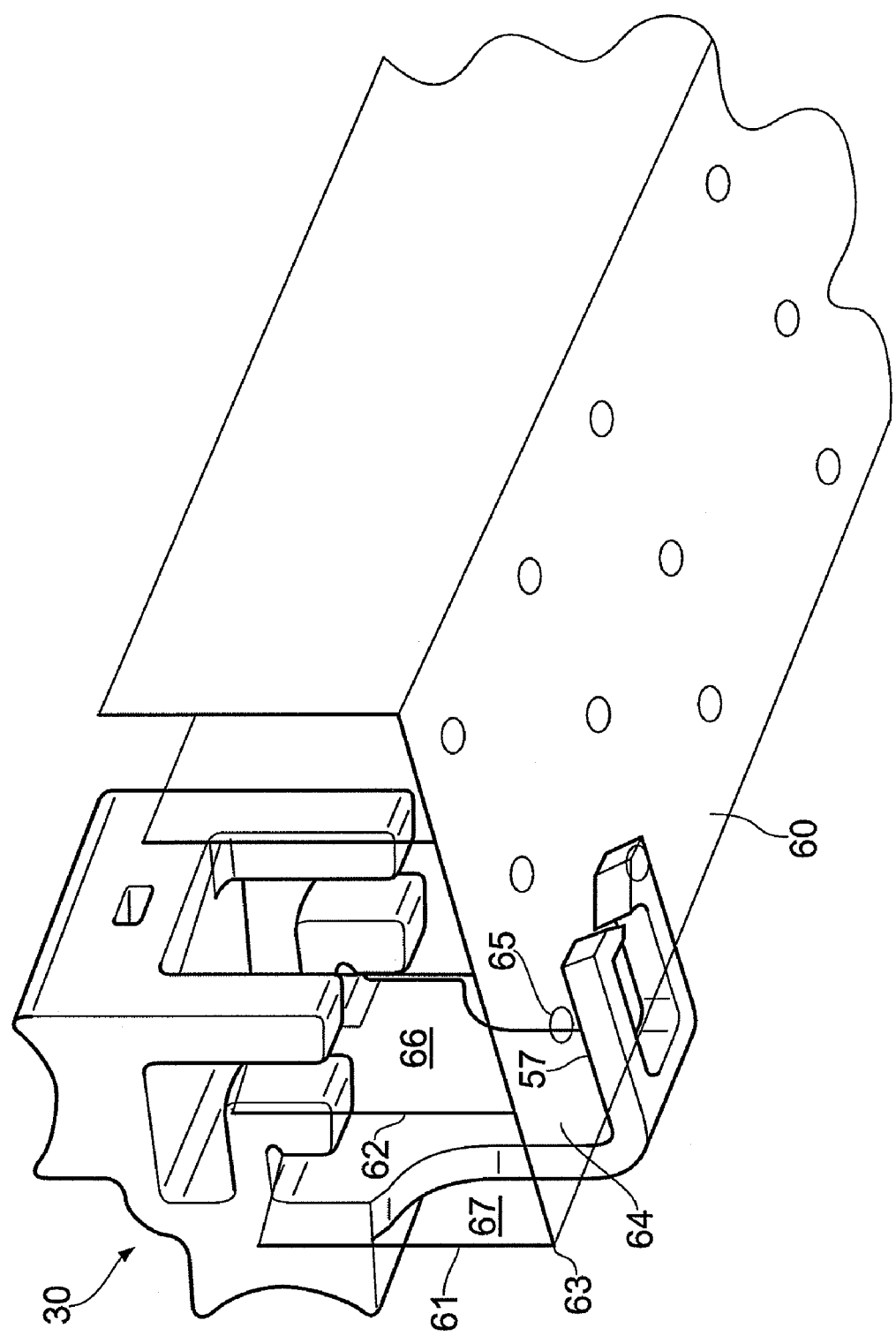
FIG. 11 is an isometric view of a raceway with the clip fitted.

The clip 30 is shown fitted onto a raceway 60 in FIG. 11. The raceway 60 has a similar profile to the raceway profiles shown in FIG. 2-6, and the clip 30 can be fitted to those profiles in a similar manner. The clip is fixed in place as follows:
   the clip is placed with the top of the side wall 61 in the inner slot 58 and the top of the side wall 62 in the outer slot 57. Initially the clip is at an angle with the distal ends of the projections 36 pressed against the outer face of the side wall 61
   the clip is pushed down to slide the side walls 61,62 further into the slots 58,57. As this happens, the clip arm bends to the side
   when the distal ends of the projections 36 clears the corner 63 where the base 64 of the raceway meets the side wall 61, the arm springs back resiliently into the position shown in FIG. 11.

In the position shown in FIG. 11, the upper faces 57' of the projections 36 engage the underside of the base 64. The projections are also slightly bent from their relaxed configuration shown in FIG. 8 (in which they lie at an acute angle to the clip arm 33) towards a more perpendicular configuration. This ensures a positive engagement with the base 64, fixing the clip in place.

The projections 36 also extend to either side of the head 16 of a harpoon tie (not shown in FIG. 11) which extends through the hole 65. This restricts the movement of the clip along the length of the raceway. That is, if the clip is slid in either direction, a face 37 of one of the projections 36 will engage the harpoon tie and prevent any further movement. Lengthwise movement of the clip is also restricted in a similar way by the gripping arms 41 and hooks 50. That is, the gripping arms 41 extend to either side of a clamp and fairlead (not shown) in the inner trough 66, and the hooks 50 extend to either side of a clamp and fairlead (not shown) in the outer trough 67. If the clip is slid in either direction, a face 44 of one of the arms 41, and a face 52 of one of the hooks 50 will engage the clamp/fairlead assembly to prevent any further movement.

A second clip 70 is shown in FIGS. 12-15. The clip 70 has a body portion 71 carrying a cable-receiving trough 72; and a pair of clip arms 73a,73b extending from opposite ends of the body portion 71 at corners 74a,74b. The clip arm 73b carries a second cable-receiving trough 95 at its proximal end. The clip arms 73a,73b are configured to bend resiliently in a bending plane perpendicular to the length of the raceway. The bending plane is shown by a dashed line 78 in FIGS. 12 and 14, and the bending motion is shown by an arrow 75 in FIG. 13.

The troughs 72,95 each have a respective slot 72',95' which passes through the fall width of the trough and receives a cable tie (not shown) to secure cables in the saddle.

Figure 13:
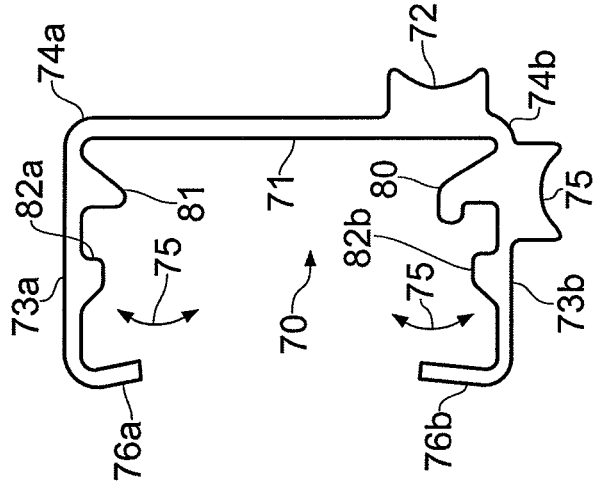
FIG. 13 is a side view of the second cable routing clip.
Figure 15:
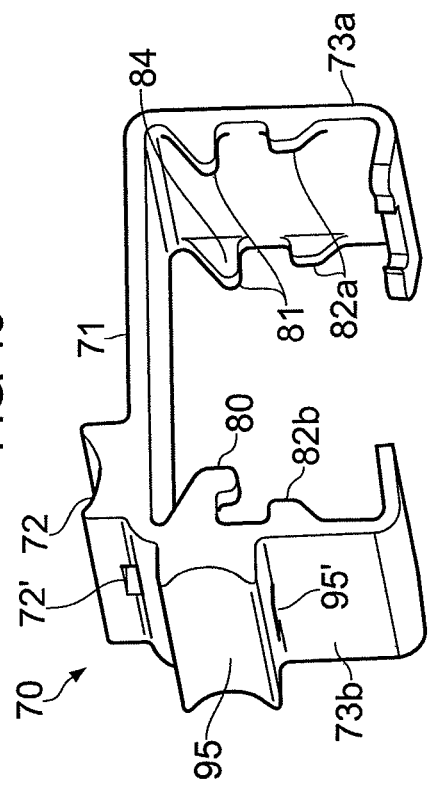
FIG. 15 is an isometric view of the second cable routing clip.
Figure 12:
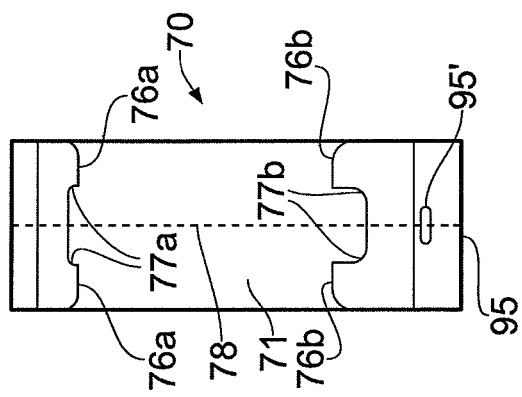
FIG. 12 is a front view of a second cable routing clip.
Figure 14:
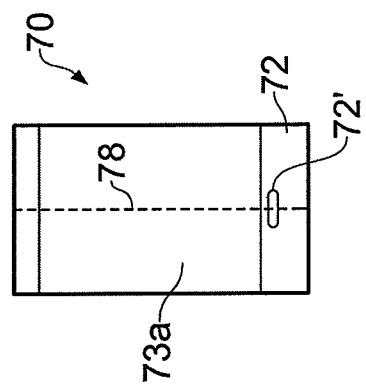
FIG. 14 is an underside view of the second cable routing clip.

A pair of projections 76a,76b extend from the distal ends of each clip arm 73a,73b at an acute angle as shown in FIG. 13. As shown most clearly in FIG. 12, the projections have opposed faces 77a,77b which are directed at an angle to the bending plane 78 and define a slot between them.

Figure 16:
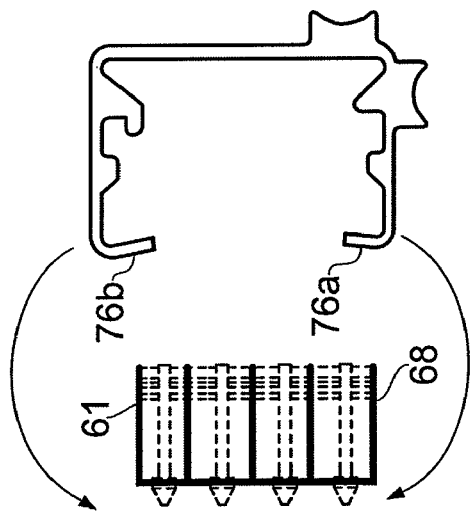
FIG. 16 is a cross-sectional side view showing the second clip being fitted to a raceway.

A pair of hooks 80 extend from the proximal end of the clip arm 73b. A pair of stand-offs 81 extend from the proximal end of the clip arm 73a. A pair of stand-offs 82a,82b also extend from the approximate mid-point of each clip arm 73a,73b The clip 30 is shown fitted onto the raceway 60 in FIG. 17. The clip is fixed in place as shown in FIG. 16, as follows:
the clip is pushed onto the raceway 60 with the lower faces of the projections 76a,76b pressed against the upper edges of the outer side walls 61,68
the clip is pushed down. As this happens, the clip arms bend to the side as shown in FIG. 16
when the distal ends of the projections 76a,76b clear the corners where the base 64 of the raceway meets the side walls 61,68 the clip arms springs back resiliently into the position shown in FIG. 17.

Figure 17:
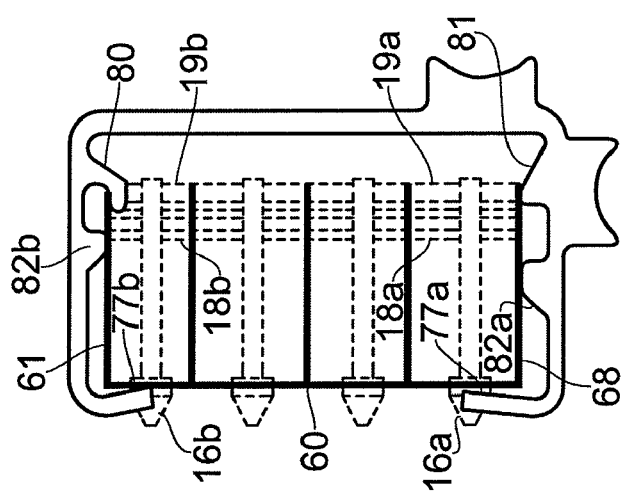
FIG. 17 shows the second clip fitted in place.

In the position shown in FIG. 17, the upper faces 77a,77b of the projections 76a,76b engage the underside of the base 64. The projections are also slightly bent from their relaxed configuration shown in FIG. 13 (in which they lie at an acute angle to the clip arm) towards a more perpendicular configuration. This ensures a positive engagement with the base 64, fixing the clip in place.

The stand-offs 81, 82a and 82b engage the side walls 61,68 to maintain a gap between the clip arms and the side walls. The projections 76a,76b at the ends of the clip arms are positioned on opposite sides of the head 16a,16b of a respective harpoon tie which extends through the base 64. This restricts the movement of the clip along the length of the raceway. That is, if the clip is slid in either direction, a face 77a,77b of one of the projections 76a,76b will engage the head of the harpoon tie and prevent any further movement.

Figure 18:
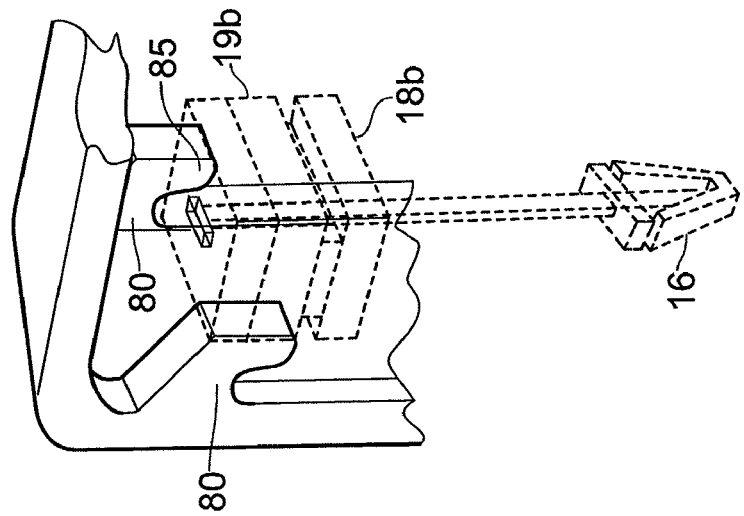
FIG. 18 is an isometric view of a detail of the second clip showing its engagement with the fairlead assembly.

Lengthwise movement of the clip is also restricted in a similar way by the hooks 80. The hooks 80 fit over the end of the side wall 60 as shown in FIG. 17. The tips of the hooks 80 are positioned on opposite sides of the clamp 18b and fairlead 19b so as to restrain movement of the clip along the raceway as shown in FIG. 18. If the clip is slid in either direction, a face 85 of a tip of one of the hooks 80 will engage a respective clamp/fairlead assembly to prevent any further movement.

Because the cables mounted on the clips described above will be routed outside the confines of the raceways, the lightning protection provided by the raceways will be lost. Therefore screened cables are mounted in the clips. The screening is earthed at both ends.

The clips may be easily retro-fitted to a raceway in-situ on a wing spar. Typically the clips are used to support the wingtip strobe light power cables and wingtip navigation light power cables only: the remaining cables being left in the raceway. The wingtip strobe light power cables and wingtip navigation light power cables may be removed from the raceway and then installed in the clips. However this runs the risk of causing damage to the raceway installation. Therefore preferably the old wingtip strobe light and navigation light power cables in the raceway are left in place, cut at either end, and replaced by new screened cables mounted in the clips. The new cables are spliced in at either end at the point where the old cables have been cut.

Although described above in the context of a wing raceway, either of the clips may also be used to fit cables onto a raceway in the fuselage of an aircraft.

Although the invention has been described above with reference to one or more preferred embodiments, it will be appreciated that various changes or modifications may be made without departing from the scope of the invention as defined in the appended claims.

The invention claimed is:

1. A cable routing system, comprising:
a raceway having one or more first cable supports; and
a routing clip comprising
a body portion;
one or more second cable supports;
a clip arm extending from the body portion and configured to bend resiliently in a bending plane; and
a pair of projections with opposed faces which are directed at an angle to the bending plane of the clip arm;
wherein the routing clip is secured to the cable raceway by its resilient clip arm with the projections positioned on opposite sides of part of the raceway so as to restrain movement of the clip.

2. The system of claim 1, wherein the projections are positioned on opposite sides of part of the raceway so as to restrain movement of the clip along the length of the raceway.

3. A cable routing clip, comprising:
a body portion;
one or more cable supports;
a pair of clip arms, each clip arm extending from the body portion and configured to bend resiliently in a bending plane; and
a pair of projections which extend from each clip arm and have opposed faces which are directed at an angle to the bending plane of the clip arm.

4. The clip of claim 3, wherein each opposed face is directed at an angle of substantially 90° to the bending plane of the clip arm.

5. The clip of claim 3, wherein the pair of projections extend from a distal end of the clip arm.

6. A cable routing clip, comprising:
a body portion;
one or more cable supports;
a clip arm extending from the body portion and configured to bend resiliently in a bending plane;
a pair of projections which extend from the clip arm and have opposed faces which are directed at an angle to the bending plane of the clip arm, and
a second pair of projections which extend from the body portion and have opposed faces which are directed at an angle to the bending plane of the clip arm.

7. The clip of claim 6 further comprising a gripping arm extending from the body portion,
wherein the gripping arm and the clip arm have opposed faces which are directed substantially parallel to the bending plane of the clip arm.

8. A cable routing clip, comprising:
a body portion;
one or more cable supports;

a clip arm extending from the body portion and configured to bend resiliently in a bending plane;

a pair of projections which extend from the clip arm and have opposed faces which are directed at an angle to the bending plane of the clip arm, and a pair of gripping arms extending from the body portion, wherein the gripping arms and the clip arm have opposed faces which are directed parallel to the bending plane of the clip arm, and wherein the pair of gripping arms have opposed faces which are directed at an angle to the bending plane of the clip arm.

9. The clip of claim 6, further comprising a first cable support on the body and a second cable support on the clip arm.

10. The clip of claim 6, wherein each cable support comprises a trough.

* * * * *